US010738905B2

(12) United States Patent
Ito et al.

(10) Patent No.: US 10,738,905 B2
(45) Date of Patent: Aug. 11, 2020

(54) PIEZOELECTRIC VALVE, METHOD FOR DRIVING PIEZOELECTRIC VALVE, AND OPTICAL PARTICULATE SEPARATOR EQUIPPED WITH AIR-JET MEANS USING PIEZOELECTRIC VALVE

(71) Applicants: SATAKE CORPORATION, Tokyo (JP); MECHANO TRANSFORMER CORPORATION, Tokyo (JP)

(72) Inventors: Takafumi Ito, Tokyo (JP); Hironori Arii, Tokyo (JP); Tadashi Matsushita, Tokyo (JP); Sze Keat Chee, Tokyo (JP); Takeshi Yano, Tokyo (JP); Toshiro Higuchi, Tokyo (JP)

(73) Assignees: SATAKE CORPORATION, Chiyoda-ku, Tokyo (JP); MECHANO TRANSFORMER CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 16/082,664

(22) PCT Filed: Jan. 24, 2017

(86) PCT No.: PCT/JP2017/002394
§ 371 (c)(1),
(2) Date: Sep. 6, 2018

(87) PCT Pub. No.: WO2017/154390
PCT Pub. Date: Sep. 14, 2017

(65) Prior Publication Data
US 2019/0093784 A1 Mar. 28, 2019

(30) Foreign Application Priority Data
Mar. 8, 2016 (JP) ................. 2016-045013

(51) Int. Cl.
*F16K 31/02* (2006.01)
*B07C 5/342* (2006.01)
(Continued)

(52) U.S. Cl.
CPC ............... *F16K 31/02* (2013.01); *B07B 4/02* (2013.01); *B07B 11/04* (2013.01); *B07C 5/342* (2013.01);
(Continued)

(58) Field of Classification Search
CPC ........ F16K 31/02; F16K 31/004; F16K 31/44; F16K 31/007; B07C 5/36; B07C 5/342;
(Continued)

(56) References Cited

U.S. PATENT DOCUMENTS 3,539,716 A * 11/1970 Poulett .................. H04N 5/781
386/352
3,802,558 A 4/1974 Rhys
(Continued)

FOREIGN PATENT DOCUMENTS

CN 1877171 A 12/2006
CN 103608617 A 2/2014
(Continued)

OTHER PUBLICATIONS

English translation of Nemoto et al., JPH0783344 (A) (Year: 1995).*

*Primary Examiner* — John Bastianelli
(74) *Attorney, Agent, or Firm* — Faegre Drinker Biddle & Reath LLP

(57) ABSTRACT

A piezoelectric valve, having superior responsiveness during valve opening and capability to stabilize gas supply at an early stage, includes a gas pressure chamber receiving compressed gas and an exhaust path discharging the compressed gas from the gas pressure chamber; a valve disc
(Continued)

placed in the gas pressure chamber to open and close the exhaust path; a piezoelectric element generating a driving force for operation of the valve disc, as a displacement; a displacement magnifying mechanism magnifying the displacement of the piezoelectric element and applying the magnified displacement to the valve disc; and driving means including a signal generator generating a signal including a first prepulse, a second prepulse, and a main pulse, applies a drive voltage to the piezoelectric element using the signal generated by the signal generator, as an input signal to a drive circuit, and drives and opens the valve disc by expanding the piezoelectric element.

3 Claims, 12 Drawing Sheets

(51) Int. Cl.
F16K 31/00 (2006.01)
B07C 5/36 (2006.01)
B07B 11/04 (2006.01)
B07B 4/02 (2006.01)
F16K 31/44 (2006.01)

(52) U.S. Cl.
CPC ............ *B07C 5/36* (2013.01); *F16K 31/004* (2013.01); *F16K 31/007* (2013.01); *F16K 31/44* (2013.01)

(58) Field of Classification Search
CPC .. B07B 4/00; B07B 11/04; B07B 4/02; B07B 11/02
USPC .................................................. 251/129.06
See application file for complete search history.

(56) References Cited

U.S. PATENT DOCUMENTS

| 3,911,955 | A | * | 10/1975 | Link | A01G 25/162 |
| | | | | | 137/624.2 |
| 4,669,660 | A | * | 6/1987 | Weber | F16K 31/007 |
| | | | | | 239/102.2 |
| 5,745,132 | A | * | 4/1998 | Hirabayashi | B41J 2/04528 |
| | | | | | 347/14 |
| 5,969,730 | A | * | 10/1999 | Inose | B41J 2/04528 |
| | | | | | 347/13 |
| 6,422,677 | B1 | * | 7/2002 | Deshpande | B41J 2/04563 |
| | | | | | 347/14 |
| 6,474,763 | B1 | * | 11/2002 | Murakami | B41J 2/04563 |
| | | | | | 347/10 |
| 1,877,171 | A1 | | 11/2006 | Mattes | |
| 7,916,388 | B2 | * | 3/2011 | Bykanov | G03F 7/70033 |
| | | | | | 359/349 |
| 2001/0038396 | A1 | * | 11/2001 | Imanaka | B41J 2/0451 |
| | | | | | 347/7 |
| 2004/0206409 | A1 | | 10/2004 | Yano et al. | |
| 2005/0116983 | A1 | * | 6/2005 | Wada | B41J 2/04528 |
| | | | | | 347/19 |
| 2011/0284431 | A1 | | 11/2011 | Ito et al. | |
| 2011/0317256 | A1 | * | 12/2011 | Hou | H01S 3/076 |
| | | | | | 359/337.21 |
| 2014/0110508 | A1 | | 4/2014 | Dames et al. | |
| 2014/0246607 | A1 | * | 9/2014 | Bykanov | G03F 1/22 |
| | | | | | 250/504 R |
| 2015/0060337 | A1 | | 3/2015 | Ito et al. | |
| 2016/0177855 | A1 | | 6/2016 | Kusakabe et al. | |

FOREIGN PATENT DOCUMENTS

| CN | 105378265 A | 3/2016 |
| JP | H07-83344 A | 3/1995 |
| JP | 2004-316835 A | 11/2004 |
| JP | 2011-241961 A | 12/2011 |
| WO | WO-2013/157548 A1 | 10/2013 |

* cited by examiner

PIEZOELECTRIC VALVE, METHOD FOR DRIVING PIEZOELECTRIC VALVE, AND OPTICAL PARTICULATE SEPARATOR EQUIPPED WITH AIR-JET MEANS USING PIEZOELECTRIC VALVE

CROSS REFERENCE TO PRIOR APPLICATIONS

This application is the National Stage of International Application No. PCT/JP2017/002394 filed Jan. 24, 2017 and claims benefit of Japanese Application No. 2016-045013 filed on Mar. 8, 2016, which are herein incorporated by reference in their entirety.

TECHNICAL FIELD

The present invention relates to a piezoelectric valve adapted to open and close a valve using expansion/contraction displacement of a piezoelectric element, a method for driving the piezoelectric valve, and an optical particulate separator equipped with air-jet means using the piezoelectric valve.

BACKGROUND ART

Conventionally, an optical particulate separator is known which sorts particulates such as grains or resin pellets into non-defectives and defectives by blowing grains or resin pellets using air-jets or removes foreign matter and the like mixed in particulates using air-jets.

This type of particulate separator sorts particulates falling along a predetermined trajectory from an end of a transport path, by blowing off and removing defectives and the like by air-jets according to a detection signal of the defectives and the like.

The particulate separator described above blows off defectives and the like by air-jets from particulates falling continuously in large quantities, and in order to blow off only the defectives and the like accurately without involving other particulates, it is necessary to equip an air-jet nozzle with a responsive valve.

Thus, the present applicants have developed a piezoelectric valve which opens and closes a valve at high speed using a piezoelectric element (see Patent Literatures 1 to 3).

The piezoelectric valves described in Patent Literatures 1 to 3 include a displacement magnifying mechanism adapted to magnify small displacement of the piezoelectric element based on the principle of leverage.

The optical particulate separator equipped with the air-jet nozzle which uses the piezoelectric valve accurately blows off defectives and the like with reduced risk of involving and blowing off non-defectives and the like because the piezoelectric valve is superior to conventional solenoid valves in responsiveness during valve opening and closing.

Now, the optical particulate separator has a problem in that stable sorting action is not available because the piezoelectric valve moves a valve disc via the displacement magnifying mechanism, causing vibration of the valve disc, which results in fluctuations of air jet volume from the nozzle.

Thus, to solve the above problem, Patent Literature 2 describes a piezoelectric valve which applies two-step drive voltages to a piezoelectric element.

The piezoelectric valve described in Patent Literature 2 applies a first-step voltage to the piezoelectric element, timed to drive and open the valve disc, and applies a second-step voltage higher than the first-step voltage to the piezoelectric element, timed to prevent the vibration of the valve disc occurring when the valve opens. This makes it possible to limit fluctuations in an amount of ejected gas after the valve is opened and thereby stabilize gas supply at an early stage.

However, the piezoelectric valve described in Patent Literature 2 has a problem of inferior responsiveness during valve opening compared to when the drive voltage applied to the piezoelectric element is a rectangular single-step voltage.

To solve the problem with the piezoelectric valve described in Patent Literature 2, Patent Literature 3 describes a piezoelectric valve which includes a signal generator adapted to generate a signal made up of a prepulse and a main pulse and applies a single-step drive voltage of a specific voltage value to a piezoelectric element based on the signal generated by the signal generator.

The piezoelectric valve described in Patent Literature 3 applies a drive voltage of a specific voltage value to the piezoelectric element based on the prepulse, timed to open a valve disc, and applies the drive voltage to the piezoelectric element based on the main pulse, timed to prevent the vibration of the valve disc occurring when the valve opens. This makes the piezoelectric valve superior in responsiveness during valve opening to the piezoelectric valve described in Patent Literature 2.

However, the piezoelectric valve described in Patent Literature 3 takes a longer time to limit fluctuations in the amount of ejected gas after the valve is opened than the piezoelectric valve described in Patent Literature 2 and leaves room for further improvement in order to stabilize gas supply at an early stage.

CITATION LIST

Patent Literature

[Patent Literature 1]
 Japanese Patent Laid-Open No. 2004-316835
[Patent Literature 2]
 Japanese Patent Laid-Open No. 2011-241961
[Patent Literature 3]
 International Publication No. WO 2013/157548

SUMMARY OF INVENTION

Technical Problem

An object of the present invention is to provide a piezoelectric valve which has superior responsiveness during valve opening and has capability to stabilize gas supply at an early stage as well as to provide a method for driving the piezoelectric valve.

Another object of the present invention is to provide an optical particulate separator which enables more stable particulate sorting action by using the piezoelectric valve.

Solution to Problem

To achieve the above objects, the present invention provides a piezoelectric valve which includes a gas pressure chamber adapted to receive compressed gas supplied externally and an exhaust path adapted to discharge the compressed gas from the gas pressure chamber, the piezoelectric valve including: a valve disc placed in the gas pressure chamber and adapted to open and close the exhaust path; a piezoelectric element adapted to generate a driving force needed for operation of the valve disc, as a displacement; a displacement magnifying mechanism adapted to magnify the displacement of the piezoelectric element and apply the magnified displacement to the valve disc; and driving means which includes a signal generator adapted to generate a signal including a first prepulse, a second prepulse, and a main pulse, applies a drive voltage of a specific voltage value to the piezoelectric element using the signal generated by the signal generator, as an input signal to a drive circuit, and drives and opens the valve disc by expanding the piezoelectric element.

In the present invention, preferably the driving means applies the drive voltage to the piezoelectric element based on the first prepulse, timed to open the valve disc, applies the drive voltage to the piezoelectric element based on the second prepulse, timed to limit fluctuations in an amount of gas ejected from the exhaust path just after the valve is opened, and applies the drive voltage to the piezoelectric element based on the main pulse, timed to limit further fluctuations in the amount of ejected gas after limiting the fluctuations in the amount of ejected gas.

In the present invention, preferably after limiting the further fluctuations in the amount of ejected gas, the driving means removes the drive voltage applied to the piezoelectric element based on the main pulse, timed to close the valve disc.

Also, to achieve the above objects, the present invention provides an optical particulate separator which includes transfer means for transferring to-be-sorted material optical detection means for detecting the to-be-sorted material falling off an end of the transfer means, at a detection position; and air-jet means for blowing the to-be-sorted material by jets of air based on detection results produced by the optical detection means by being provided further below the optical detection means, wherein the air-jet means includes any one of the piezoelectric valves described above, and the piezoelectric valve generates the signal including the first prepulse, the second prepulse, and the main pulse using the signal generator of the driving means based on the detection results produced by the optical detection means and drives and opens the valve disc by expanding the piezoelectric element.

In the present invention, preferably the driving means further includes a signal setting unit adapted to set patterns of the signal including the first prepulse, the second prepulse, and the main pulse, selects a most suitable signal from a plurality of signal patterns set beforehand on the signal setting unit, according to a type of to-be-sorted material, and generates the selected signal using the signal generator.

To achieve the above objects, the present invention provides a method for driving a piezoelectric valve, which includes a gas pressure chamber adapted to receive compressed gas supplied externally and an exhaust path adapted to discharge the compressed gas from the gas pressure chamber, the piezoelectric valve including: a valve disc placed in the gas pressure chamber and adapted to open and close the exhaust path; a piezoelectric element adapted to generate a driving force needed for operation of the valve disc, as a displacement; a displacement magnifying mechanism adapted to magnify the displacement of the piezoelectric element and apply the magnified displacement to the valve disc; and driving means for driving and thereby opening/closing the valve disc via expansion/contraction displacement of the piezoelectric element, wherein the driving means includes a signal generator adapted to generate a signal including a first prepulse, a second prepulse, and a main pulse, applies a drive voltage of a specific voltage value to the piezoelectric element based on the signal generated by the signal generator, and drives and opens the valve disc by expanding the piezoelectric element.

In the present invention, preferably the driving means applies the drive voltage to the piezoelectric element based on the first prepulse and thereby opens the valve disc, applies the drive voltage to the piezoelectric element based on the second prepulse and thereby limits fluctuations in an amount of gas ejected from the exhaust path just after the valve is opened, and applies the drive voltage to the piezoelectric element based on the main pulse and thereby limits further fluctuations in the amount of ejected gas after limiting the fluctuations in the amount of ejected gas.

In the present invention, preferably after limiting the further fluctuations in the amount of ejected gas, the driving means removes the drive voltage applied to the piezoelectric element based on the main pulse and closes the valve disc.

Advantageous Effects of Invention

Since the piezoelectric valve of the present invention includes driving means which includes a signal generator adapted to generate a signal including a first prepulse, a second prepulse, and a main pulse, applies a drive voltage of a specific voltage value to the piezoelectric element using the signal generated by the signal generator, as an input signal to a drive circuit, and drives and opens the valve disc by expanding the piezoelectric element, the piezoelectric valve has superior responsiveness during valve opening and has capability to stabilize gas supply at an early stage by limiting fluctuations in the amount of ejected gas at an early stage.

In the piezoelectric valve of the present invention, if the driving means removes the drive voltage applied to the piezoelectric element based on the main pulse, timed to close the valve disc after limiting fluctuations in the amount of ejected gas just after the valve is opened and then further limiting fluctuations in the amount of ejected gas, the gas can be supplied stably even if a gas ejection time is relatively short.

Since the optical particulate separator of the present invention includes the piezoelectric valve, air supply is stabilized at an early stage, which, in conjunction with high responsiveness during valve opening, allows particulates to be sorted more stably.

In the optical particulate separator of the present invention, since the driving means for the piezoelectric valve further includes a signal setting unit adapted to set patterns of the signal including the first prepulse, the second prepulse, and the main pulse, selects a most suitable signal from a plurality of signal patterns set beforehand on the signal setting unit, according to a type of to-be-sorted material, and generates the selected signal using the signal generator, stable sorting can always be carried out regardless of the type of to-be-sorted material.

In the piezoelectric valve driving method of the present invention, since the driving means includes a signal generator adapted to generate a signal including a first prepulse, a second prepulse, and a main pulse, applies a drive voltage of a specific voltage value to the piezoelectric element based on the signal generated by the signal generator, and drives and opens the valve disc by expanding the piezoelectric element, the piezoelectric valve is made superior in responsiveness during valve opening and enabled to stabilize gas supply at an early stage by limiting fluctuations in the amount of ejected gas at an early stage.

In the piezoelectric valve driving method of the present invention, if the driving means removes the drive voltage applied to the piezoelectric element based on the main pulse, and closes the valve disc after limiting fluctuations in the amount of ejected gas just after the valve is opened and then limiting further fluctuations in the amount of ejected gas, the piezoelectric valve can be enabled to stably supply gas even if a gas ejection time is relatively short.

DESCRIPTION OF EMBODIMENT

Figure 1:
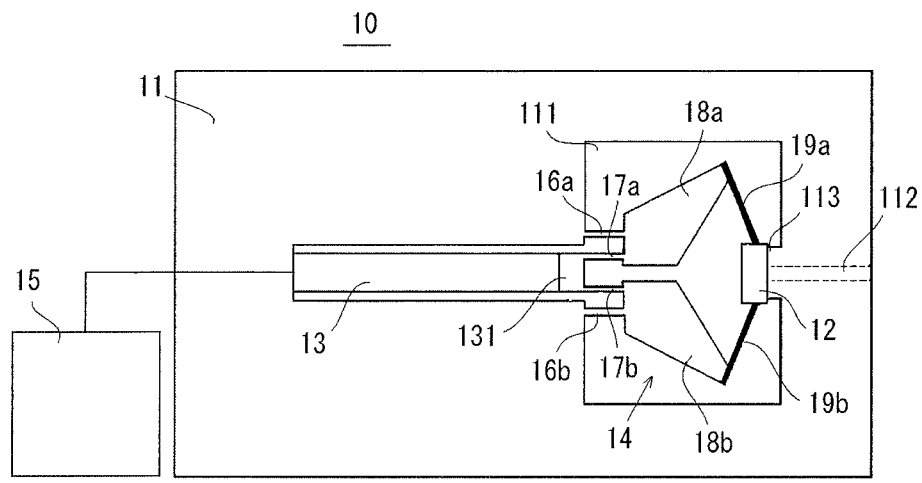
FIG. 1 is a schematic explanatory diagram of a piezoelectric valve.
Figure 2:
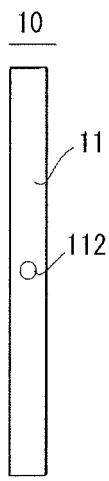
FIG. 2 is a schematic front view of the piezoelectric valve.

An embodiment of the present invention will be described with reference to the drawings.
<Piezoelectric Valve>
FIG. 1 is a schematic explanatory diagram of a piezoelectric valve with a side face of a valve body open, showing a side view with the valve open. FIG. 2 is a front view of the piezoelectric valve of FIG. 1.

The piezoelectric valve 10 includes a valve body 11, a valve disc 12, a piezoelectric element 13, a displacement magnifying mechanism 14, and a drive unit 15.

The valve body 11 includes a gas pressure chamber 111 supplied with compressed gas from an external compressed gas source (not shown) and an exhaust path 112 adapted to eject gas out of the gas pressure chamber 111.

The valve disc 12, which is placed in the gas pressure chamber 111 of the valve body 11, opens and closes the exhaust path 112.

The piezoelectric element 13 is placed in the valve body 11 with one end thereof fixed to the valve body 11.

The displacement magnifying mechanism 14, which is placed in the gas pressure chamber 111 of the valve body 11, magnifies the displacement of the piezoelectric element 13 and applies the magnified displacement to the valve disc 12.

The drive unit 15 includes a charging drive circuit adapted to expand the piezoelectric element 13 by charging the piezoelectric element 13 by the application of a drive voltage and a discharging drive circuit adapted to contract the piezoelectric element 13 by dissipating electric charges, and drives and thereby opens/closes the valve disc 12 via expansion/contraction displacement of the piezoelectric element 13.

Note that it is enough for the drive unit 15 that both the drive circuits are electrically connected to the piezoelectric element and there is no need for the drive circuits to be physically integrated, for example, with the valve body 11.

A pair of the displacement magnifying mechanisms 14 are provided symmetrically with respect to a line (hereinafter referred to as a "center line") connecting a longitudinal axis of the piezoelectric element 13 and the exhaust path 112.

A first displacement magnifying mechanism includes a first hinge 16a, a second hinge 17a, a first arm member 18a, and a first flat spring 19a. The first hinge 16a is joined at one end to the valve body 11. The second hinge 17a is joined at one end to a cap member 131 attached to the piezoelectric element 13. The first hinge 16a and second hinge 17a are joined at another end to a base of the first arm member 18a. The first flat spring 19a is joined at one end to an outer tip portion of the first arm member 18a. The first flat spring 19a is joined at another end to a side end portion of the valve disc 12 on one side.

On the other hand, the second displacement magnifying mechanism includes a third hinge 16b, a fourth hinge 17b, a second arm member 18b, and a second flat spring 19b. The third hinge 16b is joined at one end to the valve body 11. The fourth hinge 17b is joined at one end to the cap member 131 attached to the piezoelectric element 13. The third hinge 16b and fourth hinge 17b are joined at another end to a base of the second arm member 18b. The second flat spring 19b is joined at one end to an outer tip portion of the second arm member 18b. The second flat spring 19b is joined at another end to a side end portion of the valve disc 12 on another side.

In the piezoelectric valve 10, when a drive voltage is applied to the piezoelectric element 13 in the state of FIG. 1 by the drive unit 15, charging the piezoelectric element 13, the piezoelectric element 13 expands in the upper right direction of FIG. 1. Displacement resulting from the expansion of the piezoelectric element 13 is magnified by the first displacement magnifying mechanism using the principle of leverage with the second hinge 17a serving as a point of effort, the first hinge 16a as a fulcrum, and a tip portion of the first arm member 18a as a point of application, and the outer tip portion of the first arm member 18a is displaced greatly. Similarly, the displacement resulting from the expansion of the piezoelectric element 13 is magnified by the second displacement magnifying mechanism using the principle of leverage with the fourth hinge 17b serving as a point of effort, the third hinge 16b as a fulcrum, and a tip portion of the second arm member 18b as a point of application, and the outer tip portion of the second arm member 18b is displaced greatly.

Then, the displacement of the outer tip portions of the first arm member 18a and second arm member 18b makes the valve disc 12 spaced away from a valve seat 113 via the first flat spring 19a and second flat spring 19b and thereby opens the exhaust path 112.

On the other hand, in the piezoelectric valve 10, the piezoelectric element 13 contracts when discharged by the drive unit 15 and the contraction is transmitted to the valve disc 12 via the first and second displacement magnifying mechanisms, making the valve disc 12 seated on the valve seat 113.

Here, although in the piezoelectric valve 10 of FIG. 1, a side face of the gas pressure chamber 111 is illustrated as being exposed to the outside as an example, needless to say, the gas pressure chamber 111 is used in a hermetically sealed condition.

<First Variation of Piezoelectric Valve>

Figure 3:
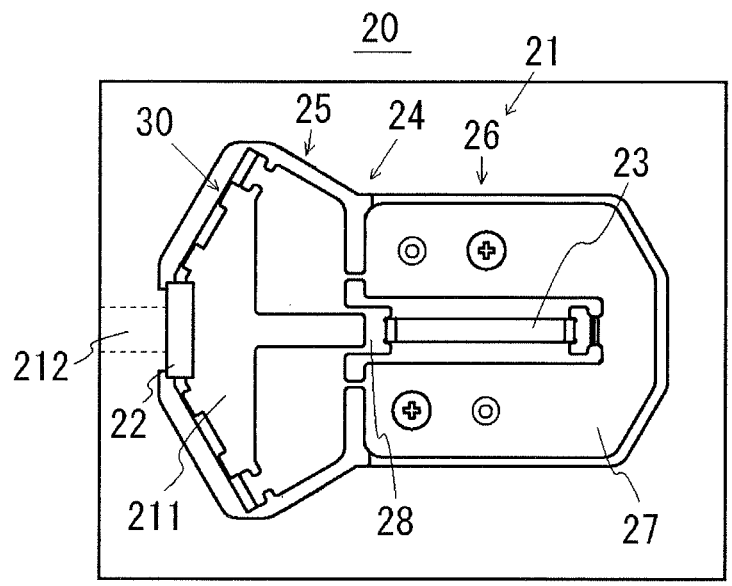
FIG. 3 is a first variation of the piezoelectric valve.

FIG. 3 is a first variation of the piezoelectric valve with a side face of a valve body open.

The piezoelectric valve 20 differs from the piezoelectric valve 10 shown in FIG. 1 in including an actuator 30 made up of a valve disc 22, a piezoelectric element 23, and a displacement magnifying mechanism 24 integrated together, and in being configured to fix the actuator 30 to a valve body 21 from a side, the valve body 21 having a gas pressure chamber 211 and an exhaust path 212.

Note that illustration of a drive unit adapted to drive and thereby open/close a valve disc 22 is omitted here.

Here, the displacement magnifying mechanism 24 includes a displacement magnifying unit 25 adapted to magnify displacement of the piezoelectric element 23 and a displacement transmission unit 26 adapted to transmit the displacement of the piezoelectric element 23 to the displacement magnifying unit 25.

The displacement transmission unit 26 includes a U-shaped base substrate 27 to which a first end of the piezoelectric element 23 is joined and a cap member 28 to which a second end of the piezoelectric element 23 is joined.

In the piezoelectric valve 20, the piezoelectric element 23 is incorporated into a space of the U-shaped base substrate 27 between the U-shaped bottom and the cap member 28, with the first end joined to the base substrate 27 and with the second end joined to the cap member 28.

Needless to say, the piezoelectric valve 20 is used also with a side face of the valve body 21 hermetically sealed.

<Second Variation of Piezoelectric Valve>

Figure 4:
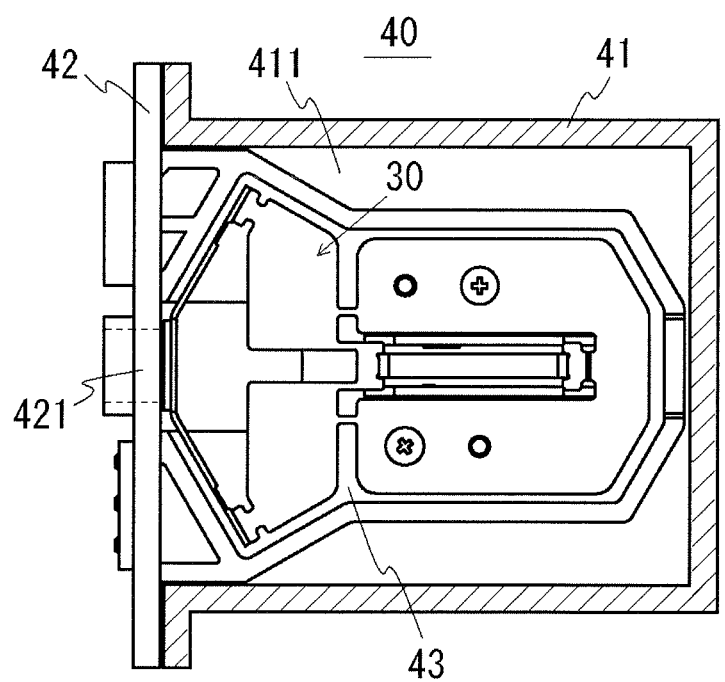
FIG. 4 is a second variation of the piezoelectric valve.

FIG. 4 is a second variation of the piezoelectric valve, showing a state in a section of the valve body. A piezoelectric valve 40 shown in FIG. 4 differs from the piezoelectric valve 20 shown in FIG. 3 in that a front face of a valve body 41 forming a gas pressure chamber 411 is open, that an exhaust path 421 is formed in a cover 42 closing the opening, that a plate 43 disposed inside the valve body 41 is formed integrally with the cover 42, and that the actuator 30 shown in FIG. 2 is fixed to the plate 43.

Note that again illustration of a drive unit adapted to drive and thereby open/close a valve disc is omitted.

The piezoelectric valve 40 is assembled by disposing the plate 43 with the actuator 30 fixed thereto in the valve body 41 through the opening in the front face of the valve body 41 and closing the opening in the valve body 41 with the cover 42 formed integrally with the plate 43.

Example (Double-Prepulse Signal)

Figure 5:
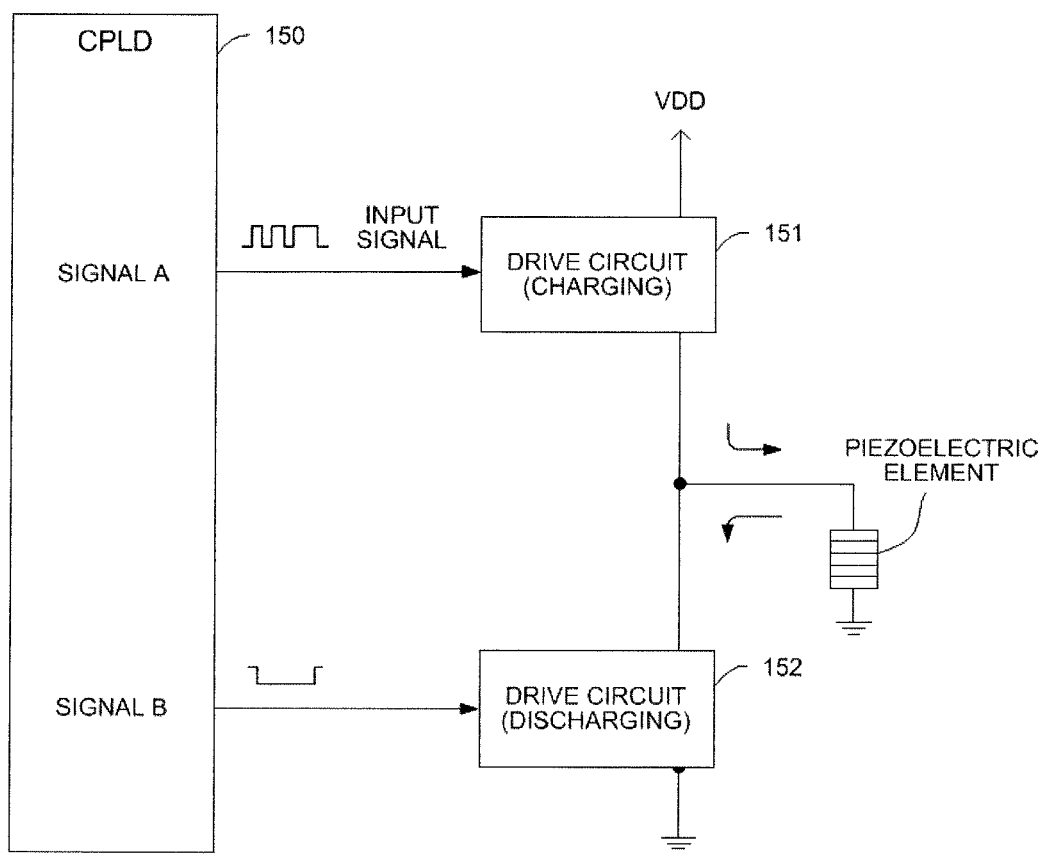
FIG. 5 is a block diagram of a circuit configuration of the drive unit in the piezoelectric valve of the present invention.
Figure 6:
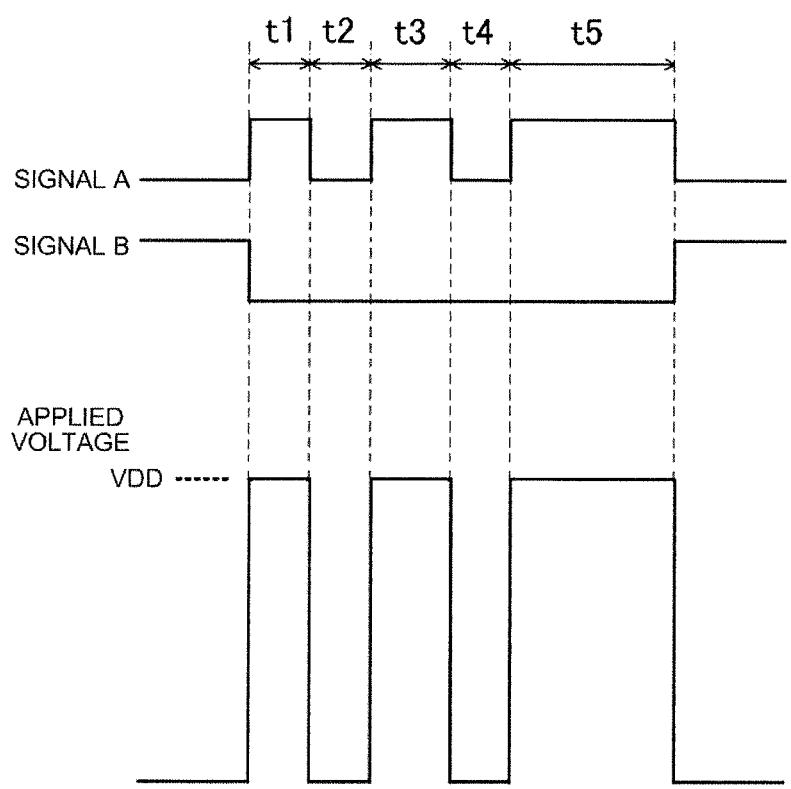
FIG. 6 is a timing chart of signals generated by the drive unit of the piezoelectric valve of the present invention and an applied voltage of a piezoelectric element.

FIG. 5 shows a block diagram of a circuit configuration of the drive unit in the piezoelectric valve of the present invention. FIG. 6 shows a timing chart of signals generated by the drive unit and an applied voltage of a piezoelectric element.

As shown in FIG. 5, the drive unit in the piezoelectric valve of the present invention causes a signal generator 150 to generate one charge signal A (hereinafter referred to as a "double-prepulse signal") made up of a first prepulse, second prepulse, and main pulse, applies a voltage to the piezoelectric element to charge the piezoelectric element using the double-prepulse signal as an input signal to a charging drive circuit 151, and thereby expands the piezoelectric element. Also, using a discharge signal B generated by the signal generator 150, as an input signal to a discharging drive circuit 152, the drive unit causes the piezoelectric element to discharge and thereby contract.

As shown in FIG. 6, using the signal A (double-prepulse signal) generated by the signal generator 150, as an input signal to the charging drive circuit 151, the piezoelectric valve of the present invention applies a single-step drive voltage of a specific voltage value to the piezoelectric element, simplifying the circuit configuration of the drive unit.

Figure 7:
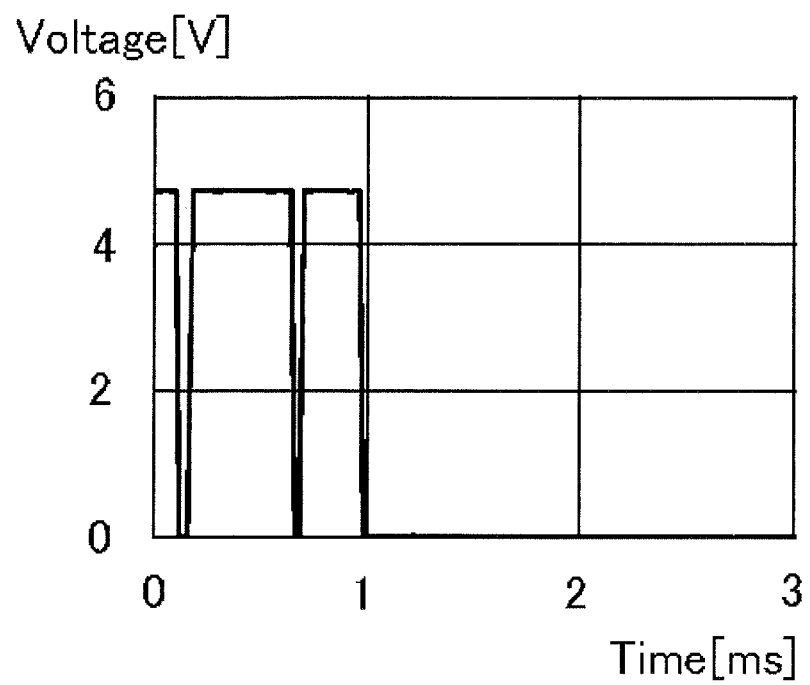
FIG. 7 is a graph showing an input signal to a charging drive circuit in an example of the present invention.
Figure 8:
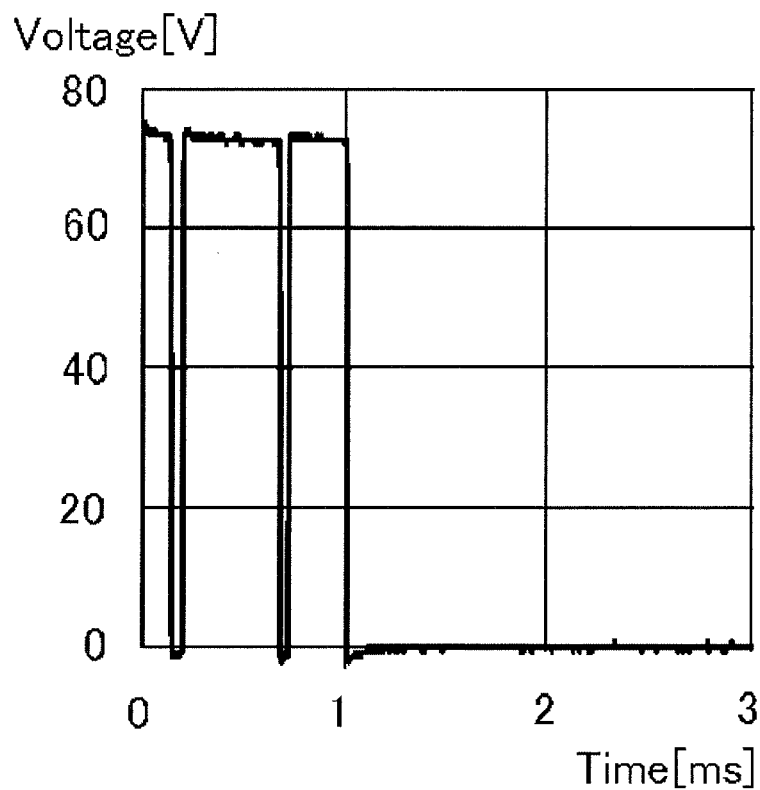
FIG. 8 is a graph showing a drive voltage applied to the piezoelectric element based on the input signal of FIG. 7.
Figure 9:
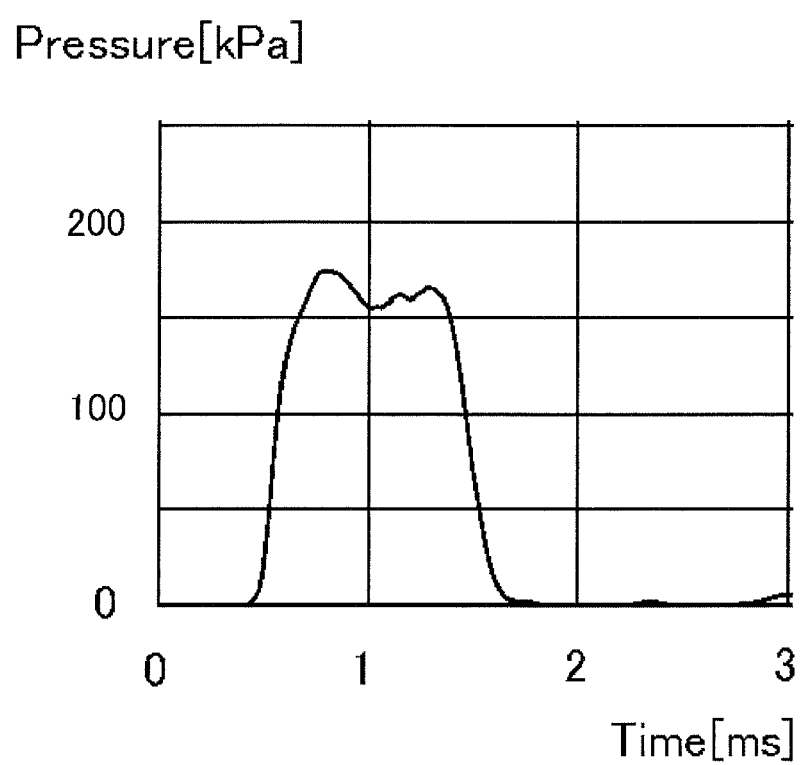
FIG. 9 is a graph showing ejection pressure characteristics of air ejected from an exhaust path of the piezoelectric valve opened by the drive voltage of FIG. 8.

FIG. 7 shows an input signal (double-prepulse signal) to the charging drive circuit 151 in the piezoelectric valve of the present invention. FIG. 8 shows a drive voltage applied to the piezoelectric element based on the input signal. FIG. 9 shows a graph of ejection pressure characteristics of air ejected from an exhaust path opened by the drive voltage. As compressed gas supplied from outside the piezoelectric valve, compressed air is used here.

The experimental conditions for the graphs shown in FIGS. 7 to 9 are as follows.
(1) Compressed air supply pressure: 0.20 MPa (gauge pressure value under atmospheric pressure)
(2) Drive voltage: 72 V
(3) Set flow rate of compressed air: 52 L/min
(4) Input signal: first prepulse time t1=0.135 ms
  First quiescent time t2=0.064 ms
  Second prepulse time t3=0.470 ms
  Second quiescent time t4=0.050 ms
  Main pulse time t5=0.281 ms
  (Conduction time of piezoelectric element: 1 ms)
(5) Air ejection pressure detection position: 2 mm from leading end of exhaust path Here, the conditions of times t1 to t5 for the input signal (double-prepulse signal) are determined based on the compressed air supply pressure, drive voltage, and air ejection time.

In the present example, the first prepulse time t1 and first quiescent time t2 (second prepulse input timing) have been set to provide an optimum timing condition such that the air ejection pressure will rise quickly during valve opening and that fluctuations in the air ejection pressure just after valve opening will be limited (to prevent the valve disc from vibrating in reaction to the opening valve).

Also, the second prepulse time t3 and second quiescent time t4 (main pulse input timing) have been set to provide an optimum timing condition for limiting further fluctuations in the air ejection pressure after the fluctuations in the air ejection pressure just after valve opening is limited.

Furthermore, the main pulse time t5 is set based on the air ejection time. Here, the main pulse time t5 has been set to provide a timing condition for closing the valve disc after the further fluctuations in the air ejection pressure is limited.

In the piezoelectric valve of the present invention, the drive unit includes a non-illustrated signal setting unit, and signal patterns of plural double-prepulse signals have been set in advance on the signal setting unit according to combinations of the compressed air supply pressure and drive voltage.

In the piezoelectric valve of the present invention, the double-prepulse signal can be generated by the signal generator 150, not only based on manual input of the times t1 to t5 by an operator, but also by being selected from signal patterns of plural double-prepulse signals set beforehand on the signal setting unit.

Comparative Example (Prepulse Signal)

Figure 10:
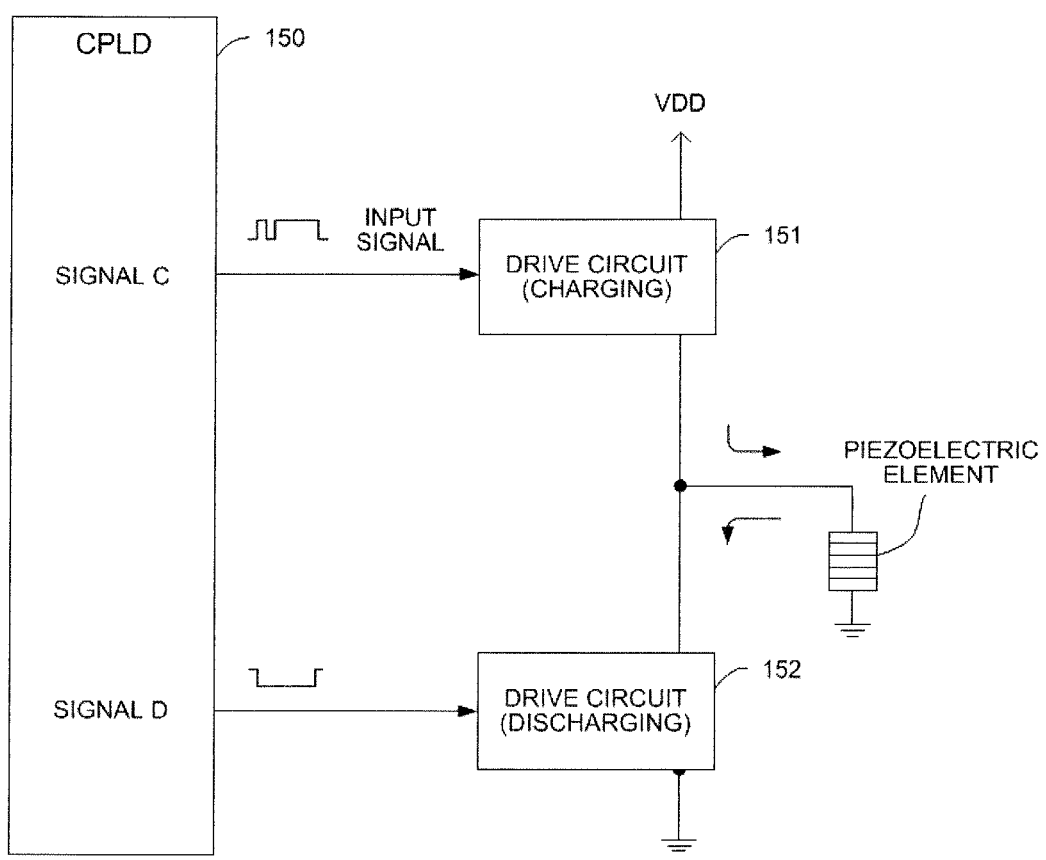
FIG. 10 is a block diagram of a circuit configuration of a drive unit in a conventional piezoelectric valve.
Figure 11:
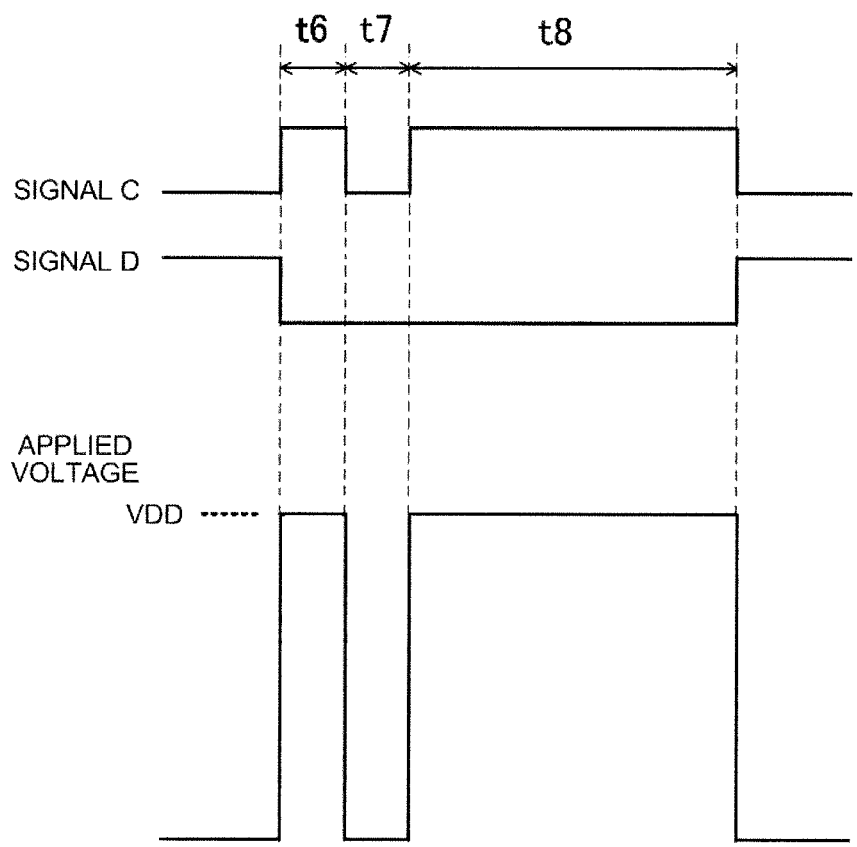
FIG. 11 is a timing chart of signals generated by the drive unit of the conventional piezoelectric valve and an applied voltage of a piezoelectric element.

FIG. 10 shows a block diagram of a circuit configuration of a drive unit in the conventional piezoelectric valve described in Patent Literature 3. FIG. 11 shows a timing chart of signals generated by the drive unit and an applied voltage of a piezoelectric element.

As shown in FIGS. 10 and 11, the conventional piezoelectric valve is equal in drive unit circuit configuration to the piezoelectric valve of the present invention shown in FIGS. 5 and 6, but differs in the signals generated by the drive unit and the waveform of the applied voltage of the piezoelectric element.

As shown in FIG. 10, the drive unit in the conventional piezoelectric valve causes a signal generator 150 to generate one charge signal C (hereinafter referred to as a "prepulse signal") made up of a prepulse and a main pulse, applies a voltage to the piezoelectric element to charge the piezoelectric element using the prepulse signal as an input signal to a charging drive circuit 151, and thereby expands the piezoelectric element. Also, using a discharge signal D generated by the signal generator 150, as an input signal to a discharging drive circuit 152, the drive unit causes the piezoelectric element to discharge and thereby contract.

Figure 12:
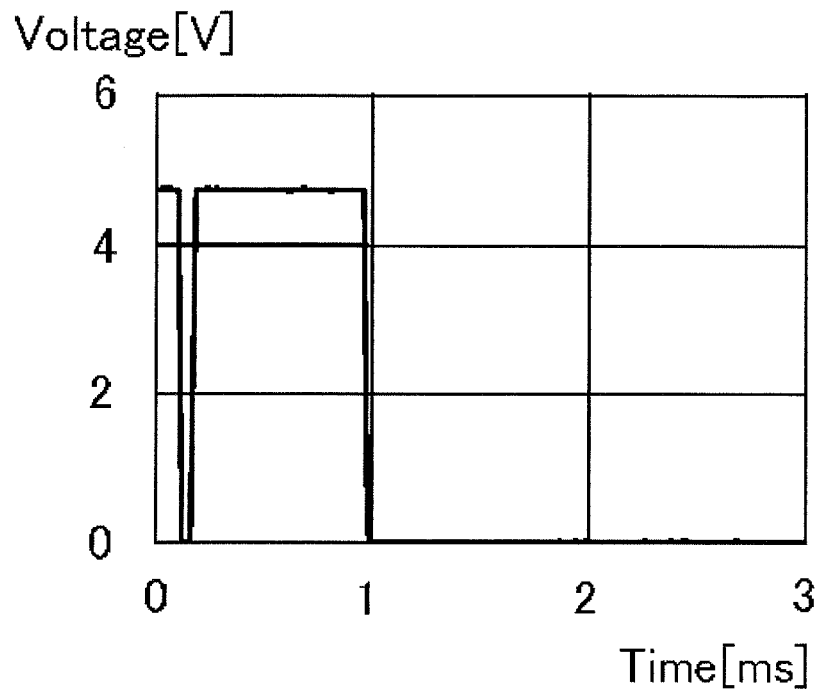
FIG. 12 is a graph showing an input signal to a charging drive circuit in a comparative example.
Figure 13:
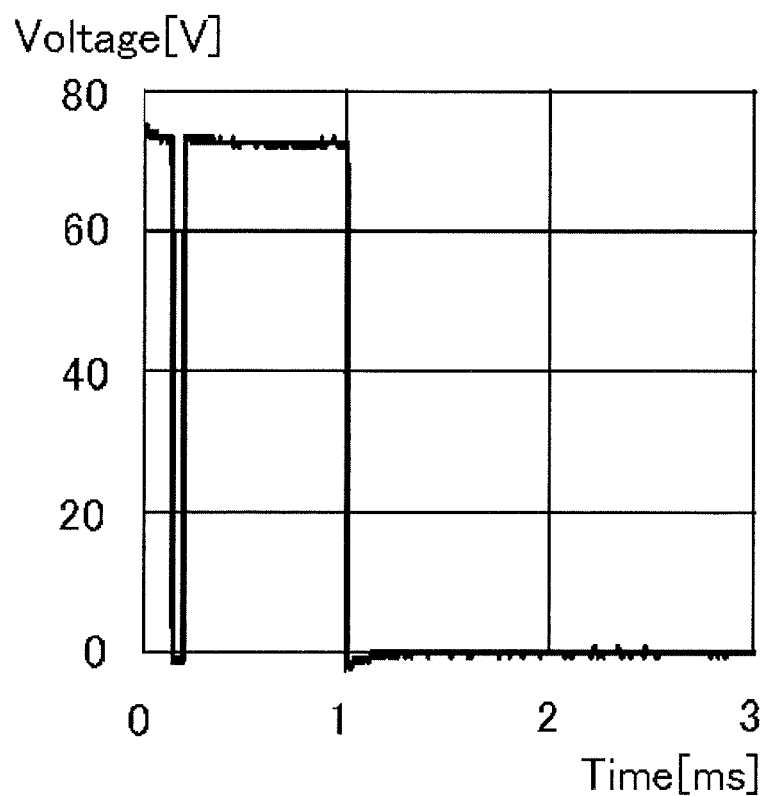
FIG. 13 is a graph showing a drive voltage applied to a piezoelectric element based on the input signal of FIG. 12.
Figure 14:
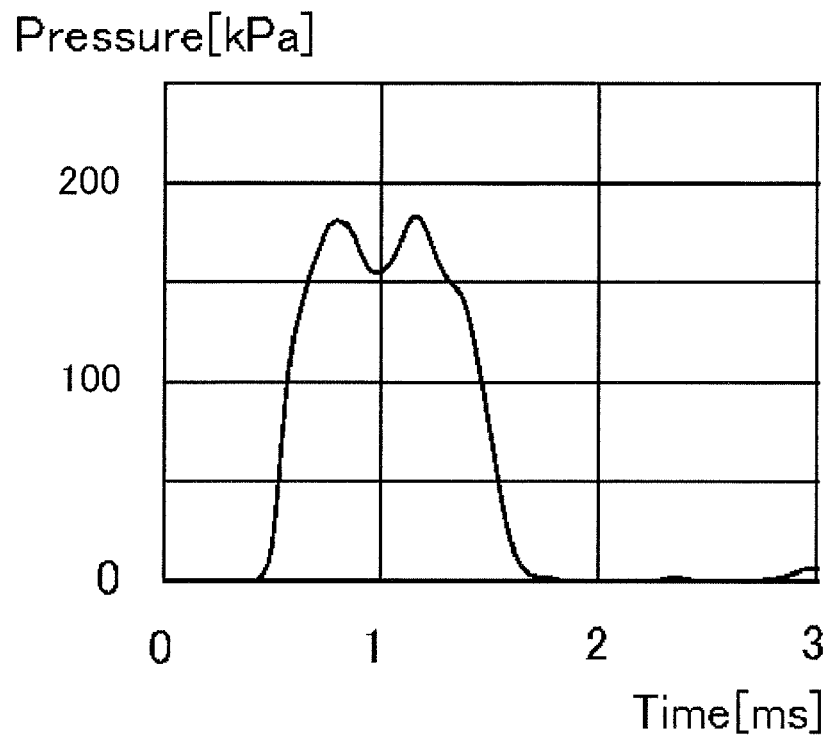
FIG. 14 is a graph showing ejection pressure characteristics of air ejected from an exhaust path of the piezoelectric valve opened by the drive voltage of FIG. 13.

FIG. 12 shows an input signal (prepulse signal) to the charging drive circuit 151 in the conventional piezoelectric valve. FIG. 13 shows a drive voltage applied to the piezoelectric element based on the input signal. FIG. 14 shows a graph of ejection pressure characteristics of air ejected from an exhaust path opened by the drive voltage. As compressed gas supplied from outside the piezoelectric valve, compressed air is used here.

The experimental conditions for the graphs shown in FIGS. 12 to 14 are as follows.
(1) Compressed air supply pressure: 0.20 MPa
(2) Drive voltage: 72 V
(3) Set flow rate of compressed air: 52 L/min
(4) Input signal: prepulse time t6=0.135 ms
   Quiescent time t7=0.064 ms
   Main pulse time t8=0.801 ms
   (Conduction time of piezoelectric element: 1 ms)
(5) Air ejection pressure detection position: 2 mm from leading end of exhaust path Here, the prepulse time t6 and quiescent time t7 (main pulse input timing) have been set to provide an optimum timing condition such that the air ejection pressure will rise quickly during valve opening and that fluctuations in the air ejection pressure just after valve opening will be limited (to prevent the valve disc from vibrating in reaction to the opening valve).

Also, the main pulse time t8 has been set based on the air ejection time.

Figure 15:
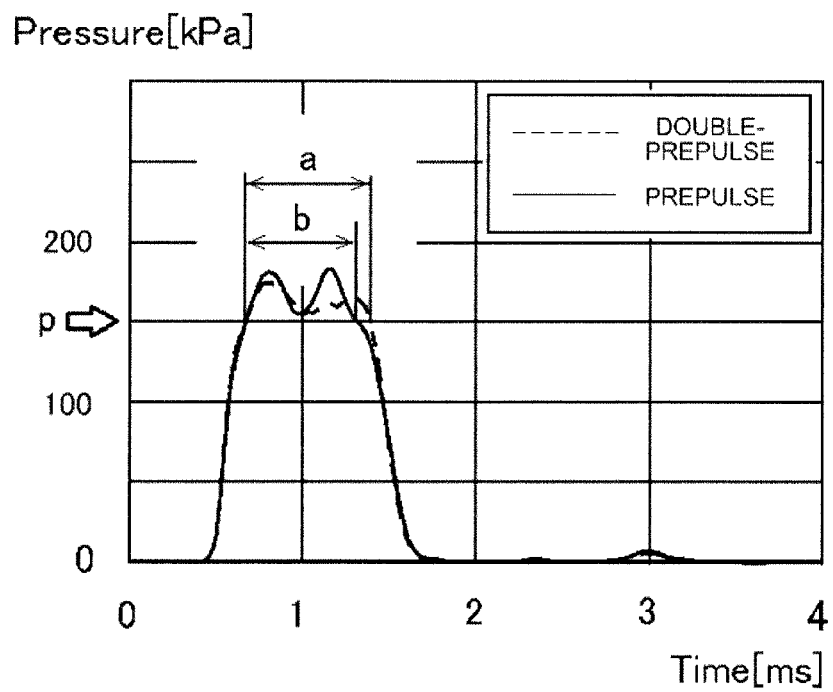
FIG. 15 is a graph comparing air ejection pressure characteristics between the example of the present invention and the comparative example.

FIG. 15 shows a graph comparing air ejection pressure characteristics between the example of the present invention and the comparative example.

In FIG. 15, the broken line represents the example, showing results obtained using a "double-prepulse signal" as an input signal to the charging drive circuit 151. The solid line represents the comparative example showing results obtained using a "prepulse signal" as an input signal to the charging drive circuit 151.

First, when the graphs of the example and comparative example are compared, because no difference is found in response characteristics during valve opening, it can be said that the piezoelectric valve of the present invention excels in responsiveness during valve opening as with the conventional piezoelectric valve.

Next, when the graphs of the example and comparative example are compared, it can be seen that whereas two ripples are observed in the comparative example, the rear ripples has almost been removed in the example.

Thus, it can be said that compared to the conventional piezoelectric valve, the piezoelectric valve of the present invention can stabilize gas supply at an early stage by limiting fluctuations in the amount of ejected gas at an early stage.

Also, when the graphs of the example and comparative example are compared, the period of time during which the air ejection pressure can be maintained at or above a predetermined value p is time b in the case of the comparative example, and is time a in the case of the example, so it can be seen that the example can maintain the air ejection pressure at or above the predetermined value p for a longer period of time than can the comparative example.

Thus, it can be said that the piezoelectric valve of the present invention can supply gas more stably than can the conventional piezoelectric valve when the air ejection time is relatively short.

<Optical Particulate Separator>

An optical particulate separator equipped with the air-jet nozzle which uses the piezoelectric valve of the present invention will be described.

Figure 16:
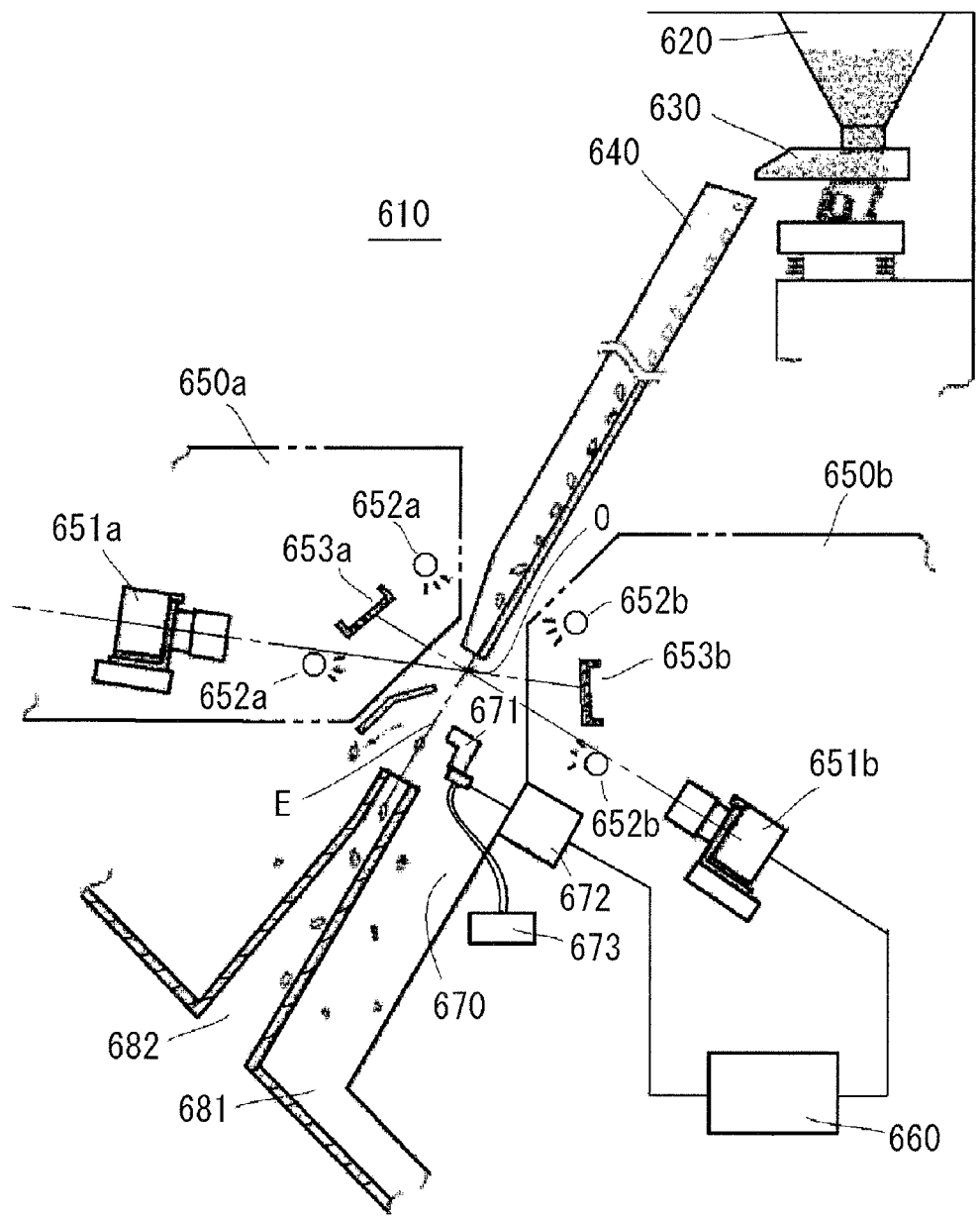
FIG. 16 is a sectional side view of principal part of an optical particulate separator.
Figure 17:
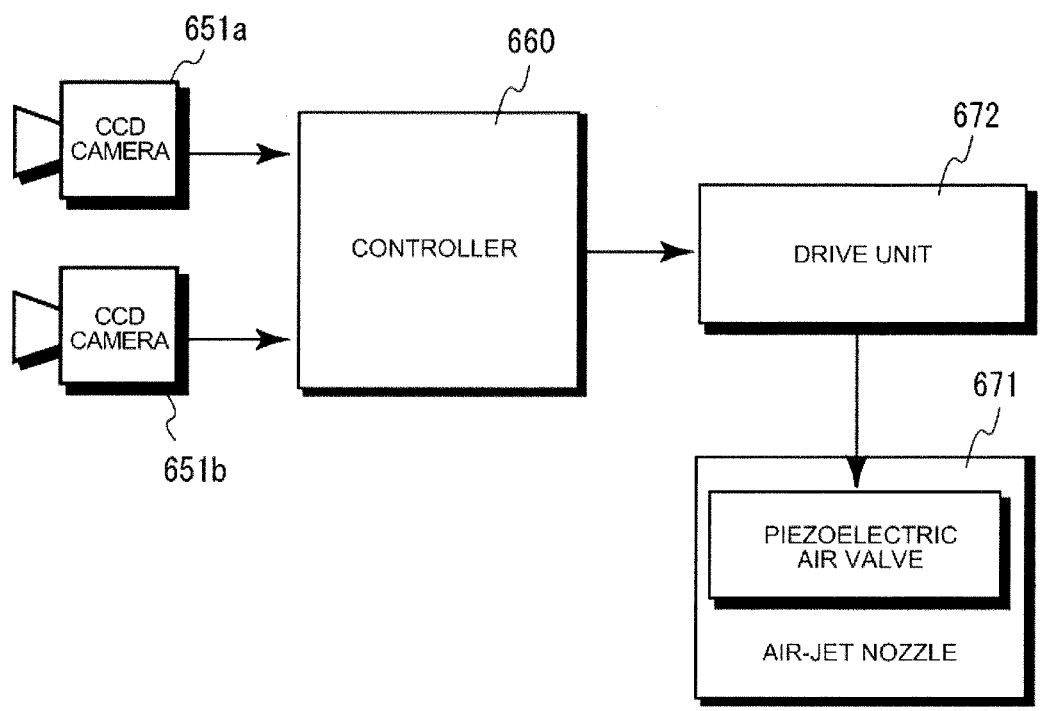
FIG. 17 is a control block diagram of the optical particulate separator shown in FIG. 16.

FIG. 16 shows a sectional side view of principal part of an optical particulate separator with an internal structure of the optical particulate separator simplified. FIG. 17 shows a control block diagram of the optical particulate separator.

An optical particulate separator 610 has a particulate supply unit in upper part, the particulate supply unit being Made up of a tank 620 and a vibrating feeder 630. An inclined chute 640 having a predetermined width is placed below the particulate supply unit.

Particulates supplied from the particulate supply unit flow continuously under gravity by spreading in a width direction on the inclined chute 640, and are then released into the air along a predetermined fall trajectory from a lower end of the inclined chute 640.

In front of and behind the predetermined fall trajectory, at least a pair of optical detectors 650a and 650b are disposed facing each other, to image particulates in a particulate detection zone O extending linearly in parallel to the width direction of the inclined chute 640. The optical detectors 650a and 650b include respective imaging means 651a and 651b such as CCD cameras each containing a CCD line sensor, respective illuminating means 652a and 652b made up of fluorescent lamps or the like, and respective backgrounds 653a and 653b used in imaging the particulates.

Also, an air-jet device 670 adapted to remove defectives and the like by jets of air is disposed below the particulate detection zone O. The air-jet device 670 includes an air-jet nozzle 671 incorporating a plurality of the piezoelectric valves of the present invention arranged side by side and a compressed air supplier 673 adapted to send compressed air to the air-jet nozzle 671, and blows particulates discharged from a lower end of the inclined chute 640 by ejecting air from the plural nozzle holes of the air-jet nozzle 671 based on detection results produced by the optical detectors 650*a* and 650*b*, the nozzle holes being provided to cover respective positions on the fall trajectory of the particulates in the width direction. Note that the piezoelectric elements of the piezoelectric valves are electrically connected to a drive circuit of a drive unit 672.

In the optical particulate separator 610, the particulates released into the air along a predetermined fall trajectory from the lower end of the inclined chute 640 after flowing continuously under gravity by spreading in the width direction on the inclined chute 640, are imaged in the particulate detection zone O by the imaging means 651*a* and 651*b* of the respective optical detectors 650*a* and 650*b*, and resulting imaging data is sent to a controller 660. The controller 660 identifies particulates to be removed, such as defectives, based on the imaging data, acquires information about sizes and the like of the particulates, and sends a reject signal concerning the defectives and the like to the drive unit 672.

The air-jet device 670 selectively drives the plural piezoelectric valves based on the reject signal sent to the drive unit 672, and jets air from the nozzle holes of the air-jet nozzle 671 to the defectives and the like passing through a particulate removal zone E extending linearly in parallel to the width direction of the inclined chute 640, the nozzle holes being provided to cover respective positions in the width direction.

In so doing, as shown in FIG. 5, based on the reject signal, the drive unit 672 causes the signal generator to generate a "double-prepulse signal" and applies a drive voltage to the piezoelectric elements of the piezoelectric valves driven selectively, using the double-prepulse signal as an input signal to the charging drive circuit.

Then, the defectives and the like blown off by air-jets from the nozzle holes of the air-jet nozzle 671 are discharged out of the apparatus through a defectives outlet 681. On the other hand, the non-defectives and the like just traveling along the predetermined fall trajectory without being blown off are recovered through a non-defectives outlet 682.

Here, the drive unit 672 includes a signal setting unit, and signal patterns of plural double-prepulse signals have been set in advance on the signal setting unit according to combinations of compressed air supply pressure and drive voltage.

On the optical particulate separator 610, the operator is supposed to enter and set the type of to-be-sorted material before starting operation. In so doing, the compressed air supply pressure, drive voltage, and air-jetting time of the piezoelectric valve are determined based on the size and weight of the to-be-sorted material. Then, based on the combination of the compressed air supply pressure and drive voltage as well as on the air-jetting time, the optical particulate separator 610 selects a most suitable signal from the signal patterns of plural double-prepulse signals set in advance on the signal setting unit of the drive unit 672 and the signal generator of the drive unit 672 generates the selected double-prepulse signal.

Note that the double-prepulse signal may be set through manual input by the operator, leaving the signal generator of the drive unit 672 to generate the set signal.

The optical particulate separator 610 equipped with the air-jet nozzle which uses the piezoelectric valves of the present invention can stabilize air supply at an early stage, which, in conjunction with high responsiveness during valve opening, allows particulates to be sorted more stably.

In the optical particulate separator, the particulates which are to be sorted are typically cereal grains, and rice grains, in particular, but are not necessarily limited to cereal grains, and may be any object as long as the object has size and mass suitable for sorting by air-jets.

Note that in the piezoelectric valve of the present invention, the displacement magnifying mechanisms may be placed asymmetrically with respect to a line connecting the longitudinal axis of the piezoelectric element and the exhaust path or a single displacement magnifying mechanism may be provided.

Also, in the piezoelectric valve of the present invention, the valve disc may be joined to one end of the arm member.

Furthermore, in the piezoelectric valve of the present invention, the longitudinal axis of the piezoelectric element does not necessarily have to coincide with an operating direction of the valve disc.

Needless to say, the present invention is not limited to the embodiment described above and the configuration of the present invention can be changed as appropriate without departing from the scope of the invention.

INDUSTRIAL APPLICABILITY

The piezoelectric valve of the present invention has superior responsiveness during valve opening and has capability to stabilize gas supply at an early stage, and can be used effectively in various fields.

REFERENCE SIGNS LIST

10 Piezoelectric valve
11 Valve body
111 Gas pressure chamber
112 Exhaust path
12 Valve disc
13 Piezoelectric element
14 Displacement magnifying mechanism
15 Drive unit
150 Signal generator
151 Charging drive circuit
152 Discharging drive circuit
18*a*, 18*b* Arm member
19*a*, 19*b* Flat spring
20 Piezoelectric valve
21 Valve body
211 Gas pressure chamber
212 Exhaust path
22 Valve disc
23 Piezoelectric element
24 Displacement magnifying mechanism
30 Actuator
40 Piezoelectric valve
41 Valve body
411 Gas pressure chamber
42 Cover
421 Exhaust path
43 Plate
610 Optical particulate separator
640 Inclined chute
650*a*, 650*b* Optical detector
651*a*, 651*b* CCD camera (imaging means)
660 Controller
670 Air-jet device
671 Air-jet nozzle
672 Drive unit
673 Compressed air supplier

The invention claimed is:

1. An optical particulate separator which includes a chute for transferring to-be-sorted material, optical detection unit for detecting the to-be-sorted material falling off an end of the chute, at a detection position; and air-jet unit for blowing the to-be-sorted material by jets of air based on detection results produced by the optical detection unit by being provided further below the optical detection unit,
   wherein the air-jet unit includes a piezoelectric valve, which includes a gas pressure chamber adapted to receive compressed gas supplied externally and an exhaust path adapted to discharge the compressed gas from the gas pressure chamber, the piezoelectric valve comprising:
   a valve disc placed in the gas pressure chamber and adapted to open and close the exhaust path;
   a piezoelectric element adapted to generate a driving force needed for operation of the valve disc, as a displacement;
   a displacement magnifying mechanism adapted to magnify the displacement of the piezoelectric element and apply the magnified displacement to the valve disc; and
   a driving unit comprising:
      a signal generator adapted to generate a signal, based on the detection results produced by the optical detection unit and drives and opens the valve disc by expanding the piezoelectric element, the signal including a first prepulse, a second prepulse, and a main pulse, the signal generator further adapted to apply a drive voltage to the piezoelectric element using the signal generated by the signal generator, as an input signal to a drive circuit, and to drive and open the valve disc by expanding the piezoelectric element; and
      a signal setting unit adapted to set patterns of the signal including the first prepulse, the second prepulse, and the main pulse, select a most suitable signal from a plurality of signal patterns set beforehand on the signal setting unit, according to a type of to-be-sorted material, and generate the selected signal using the signal generator.

2. A method for operating the optical particulate separator according to claim 1, wherein the driving unit applies the drive voltage to the piezoelectric element based on the first prepulse and thereby opens the valve disc, applies the drive voltage to the piezoelectric element based on the second prepulse and thereby limits fluctuations in an amount of gas ejected from the exhaust path just after the valve is opened, and applies the drive voltage to the piezoelectric element based on the main pulse and thereby limits further fluctuations in the amount of ejected gas after limiting the fluctuations in the amount of ejected gas.

3. The method for driving a piezoelectric valve according to claim 2, wherein after limiting the further fluctuations in the amount of ejected gas, the driving unit removes the drive voltage applied to the piezoelectric element based on the main pulse and closes the valve disc.

* * * * *